(12) United States Patent
Breuer et al.

(10) Patent No.: US 9,824,720 B1
(45) Date of Patent: Nov. 21, 2017

(54) TAPE CARTRIDGE IDENTIFICATION

(71) Applicant: International Business Machines Corporation, Armonk, NY (US)

(72) Inventors: Marcus Breuer, Dalheim (DE); Bernd Freitag, Partenheim (DE); Frank Krick, Ockenheim (DE); Tim Oswald, Gimbsheim (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/267,155

(22) Filed: Sep. 16, 2016

(51) Int. Cl.
*G06K 7/00* (2006.01)
*G11B 23/04* (2006.01)
*G06K 19/077* (2006.01)
*G06K 19/06* (2006.01)
*G06K 7/10* (2006.01)
*G06Q 10/08* (2012.01)
*G11B 23/06* (2006.01)
*G11B 23/32* (2006.01)

(52) U.S. Cl.
CPC ........ *G11B 23/046* (2013.01); *G06K 7/10297* (2013.01); *G06K 19/06028* (2013.01); *G06K 19/07758* (2013.01); *G06Q 10/087* (2013.01); *G11B 23/06* (2013.01); *G11B 23/32* (2013.01)

(58) Field of Classification Search
CPC ............... G06K 17/00; G06K 17/0025; G06K 19/0726; G06K 19/07718; G06K 19/07758; G06K 19/07771; G06K 1/12; G06K 7/0008
USPC .................................. 235/439, 440
See application file for complete search history.

(56) References Cited

U.S. PATENT DOCUMENTS

| 7,227,721 | B1* | 6/2007 | Kientz | G11B 23/042 |
| | | | | 360/132 |
| 7,240,825 | B2* | 7/2007 | Tada | G11B 23/037 |
| | | | | 235/375 |
| 8,009,058 | B2 | 8/2011 | Lehmann et al. | |
| 8,166,240 | B2 | 4/2012 | McIntosh et al. | |
| 9,242,796 | B1 | 1/2016 | Krick et al. | |
| 2007/0140525 | A1* | 6/2007 | Kottomtharayil | G06Q 10/087 |
| | | | | 382/103 |
| 2008/0084271 | A1* | 4/2008 | Jaeger | H04B 5/02 |
| | | | | 340/5.1 |
| 2010/0254241 | A1* | 10/2010 | Aoki | G06F 3/0605 |
| | | | | 369/84 |

* cited by examiner

*Primary Examiner* — Seung Lee
(74) *Attorney, Agent, or Firm* — Gilbert Harmon, Jr.

(57) ABSTRACT

An apparatus includes a tape cartridge housing, an RFID chip attached to the tape cartridge housing. The RFID chip includes a tape cartridge ID and tape cartridge information, a time relay operably connected to the RFID chip, and external contact points configured to contact another RFID chip of another tape cartridge within the same tier. A method includes receiving a tape cartridge label read request including a position indicator corresponding to a location of a tape cartridge of interest, moving a tape cartridge gripper to the location indicated by the position indicator, activating a field coil on the tape cartridge gripper to provide power to an RFID chip on a selected tape cartridge, detecting information transmitted by the RFID chip on the selected tape cartridge, determining if the selected tape cartridge is the tape cartridge of interest, and activating a next RFID chip on an adjacent tape cartridge.

20 Claims, 6 Drawing Sheets

TAPE CARTRIDGE IDENTIFICATION

BACKGROUND OF THE INVENTION

The present invention relates generally to the field of tape cartridge libraries, and more specifically to identifying tape cartridge labels within a library.

Tape libraries are devices that provide storage for large amounts of data. Tape libraries are a cost-effective solution for large scale data storage, and also provide systematic access to large data quantities. In tape libraries, each tape is labeled in some manner to enable easy identification of each tape cartridge. For example, a bar code label may contain a volume serial number (VOLSER) that is human-readable, as well as a bar code that can be read electronically. These labels may be produced by a number of various vendors and placed manually on the cartridge by a client. Tape libraries are typically used as backups and as the final stages of digital archiving.

SUMMARY

As disclosed herein, an apparatus includes a tape cartridge housing, an RFID chip attached to the tape cartridge housing, wherein said RFID chip includes a tape cartridge ID and tape cartridge information, a time relay operably connected to the RFID chip, and external contact points configured to contact another RFID chip of another tape cartridge within the same tier.

Also disclosed herein, a method includes receiving a tape cartridge label read request including a position indicator corresponding to a location of a tape cartridge of interest, moving a tape cartridge gripper to the location indicated by the position indicator, activating a field coil on the tape cartridge gripper to provide power to an RFID chip on a selected tape cartridge, detecting information transmitted by the RFID chip on the selected tape cartridge, determining if the selected tape cartridge is the tape cartridge of interest, and activating a next RFID chip on an adjacent tape cartridge. A computer program product corresponding to the method is also disclosed.

DETAILED DESCRIPTION

Currently available techniques for identifying tape cartridges may require manual placement of labels, which can be time consuming and fault prone. The quality of the labels may be variable, and taking inventory of a tape library requires removing all tape cartridges from their slots, which may also be time consuming. The invention disclosed herein for labeling and identifying tape cartridges eliminates the need to remove tape cartridges from a library to read the tape cartridge label information for each tape in the library.

Figure 1:
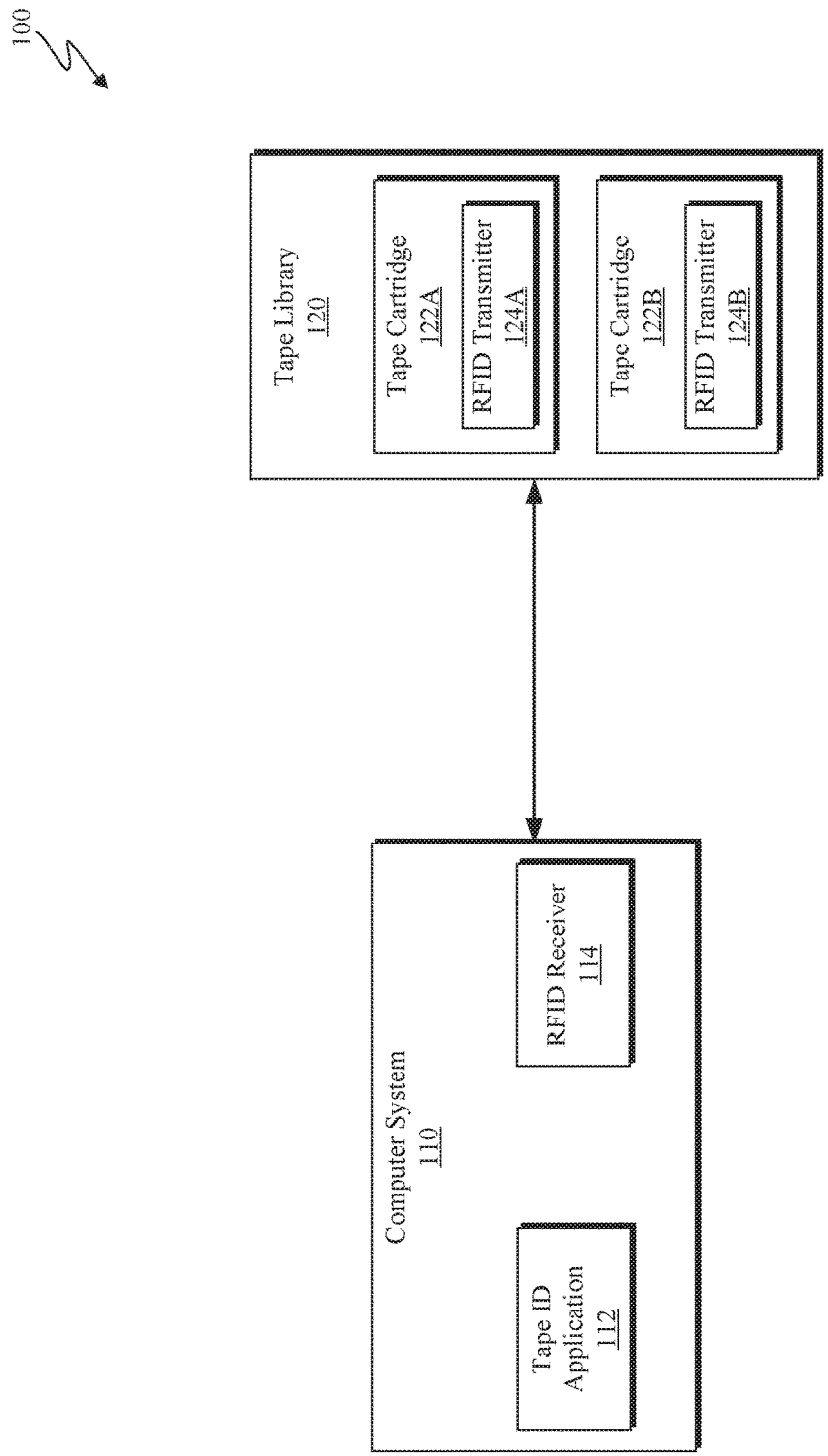
FIG. 1 is a block diagram depicting one embodiment of a tape cartridge identification system in accordance with some embodiments of the present invention.

FIG. 1 is a block diagram depicting one embodiment of a tape cartridge identification system 100 in accordance with some embodiments of the present invention. As depicted, tape cartridge identification system 100 includes a computer system 110 and a tape library 120. Tape cartridge identification system 100 may enable tapes to be identified without being removed from their respective slots in a library.

Computer system 110 can be a desktop computer, a laptop computer, a specialized computer server, or any other computer system known in the art. In some embodiments, computer system 110 represents a computer system utilizing clustered computers and components to act as a single pool of seamless resources. In general, computer system 110 is representative of any electronic device, or combination of electronic devices, capable of executing machine-readable program instructions, as described in greater detail with regard to FIG. 6.

As depicted, computer system 110 includes a tape identification application 112 and a radio-frequency identification (RFID) receiver 114. Tape identification application 112 may be configured to execute a tape identification program configured to identify tape cartridges within tape library 120. Multiple embodiments of a tape identification program executed by tape identification application 112 are discussed with respect to FIG. 2 and FIG. 3. In at least one embodiment, tape identification application 112 is configured to receive RFID information from RFID receiver 114. RFID receiver 114 may be configured to receive an RFID signal from one or more RFID transmitters 124 associated with one or more tape cartridges 122 in tape library 120.

Tape library 120 may be a storage device containing one or more tape drives, a number of slots to hold tape cartridges 122, and an automated method for loading tapes. Tape library 120 may also be referred to as a tape silo, tape robot, or tape jukebox. In one embodiment, each slot in tape library 120 can hold four tape cartridges. Each tape cartridge 122 includes an RFID transmitter 124 configured to transmit an RFID signal unique to the tape cartridge. RFID transmitters 124 may be affixed to tape cartridges 122 in a manner such as the one described with respect to FIG. 5A.

Figure 2:
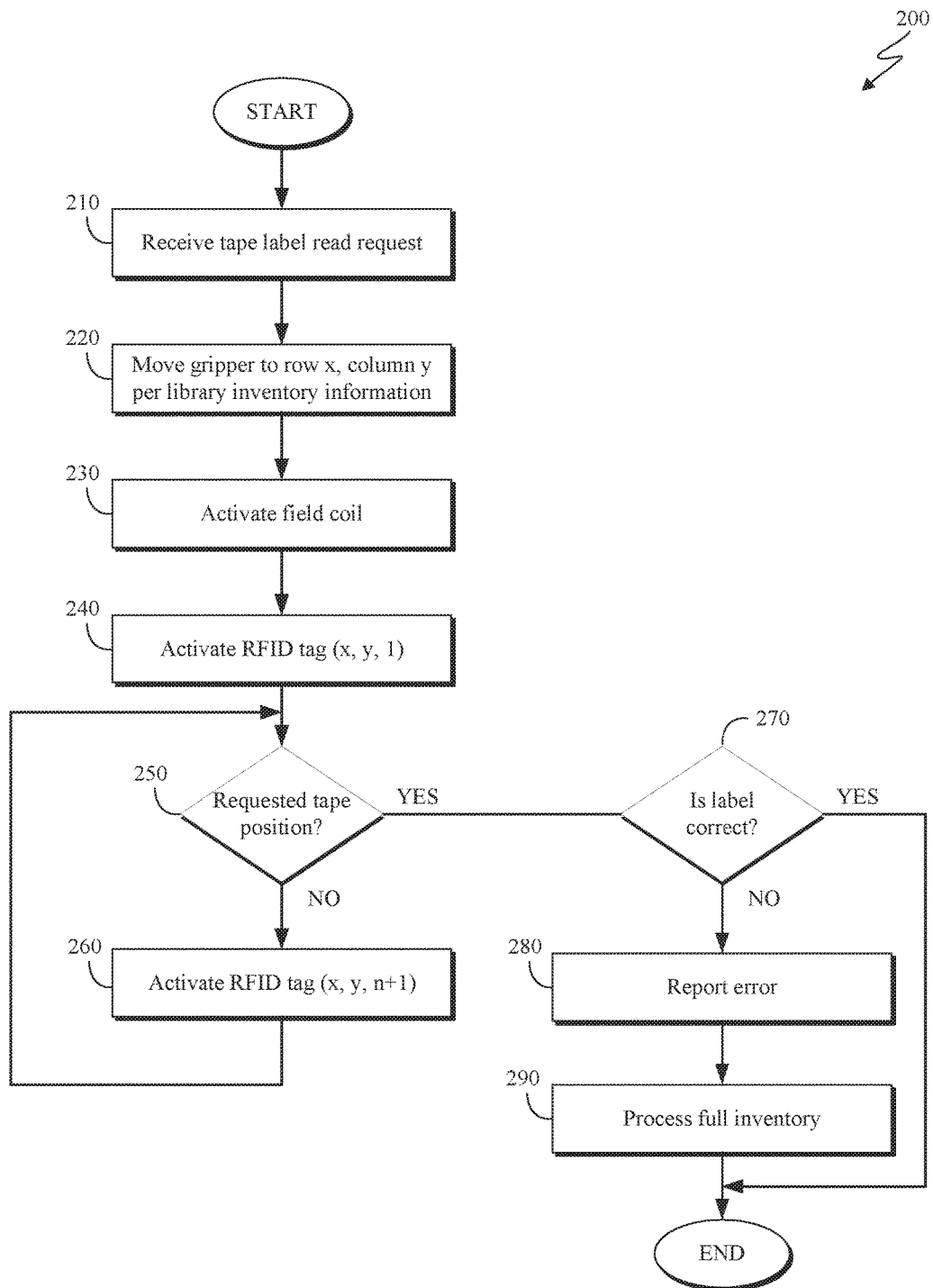
FIG. 2 is a flowchart depicting a tape cartridge identification method 200 in accordance with at least one embodiment of the present invention.

FIG. 2 is a flowchart depicting a tape cartridge identification method 200 in accordance with at least one embodiment of the present invention. As depicted, tape cartridge identification method 200 includes receiving (210) a tape label read request, moving (220) a gripper to an appropriate position, activating (230) a field coil, activating (240) an RFID tag, determining (250) if the activated RFID tag corresponds to the requested tape cartridge position, activating (260) a next RFID tag, determining (270) if a tape label is correct, reporting (280) an error, and processing (290) the full inventory of the tape library. Tape cartridge identification method 200 may enable tape cartridge labels to be read without moving the tape cartridges.

Receiving (210) a tape label read request may include receiving a request to identify or process tape label information corresponding to one or more tape cartridges. The tape label read request may be initiated by a user via a user interface. In another embodiment, the tape label read request may be initiated automatically. The tape label read request may include a position indicator corresponding to a tape cartridge of interest. The position indicator may be in (x, y) coordinate form, indicating that the tape cartridge of interest is located in a slot in row x, column y. In other embodiments, the tape label read request may be in (x, y, z) coordinate form, indicating the tape cartridge of interest is located in a position z of the slot in row x, column y.

Moving (220) a gripper to an appropriate position may include initiating a tape label reading mechanism, such as a gripper, to locate the tape cartridge of interest. The gripper may be moved to the position indicated by the tape label read request. For example, if the tape label read request was for a tape cartridge in slot (x, y, z), the gripper may be moved to the position z of the slot in row x, column y. In one embodiment, the gripper is equipped with a field coil and an RFID receptor.

Activating (230) a field coil may include activating an electromagnet used to generate a magnetic field. The field coil may be housed in the gripper mechanism associated with the tape library. In at least one embodiment, the field coil is activated according to a user initiated request. In another embodiment, the field coil is activated automatically upon the gripper reaching the appropriate position.

Activating (240) an RFID tag (x, y, 1) may include activating an RFID tag affixed to a tape cartridge. In one embodiment, RFID tag (x, y, 1) corresponds to an RFID tag affixed to a tape cartridge occupying the first position of slot (x, y). The RFID tag (x, y, 1) may be activated responsive to activating (230) a field coil. The field coil may be used to charge the RFID tag (x, y, 1), enabling the tape cartridge's label information to be transmitted. RFID tag (x, y, 1) may include a bar code as well as a volume serial number corresponding to the tape cartridge. In some embodiments, the RFID tag (x, y, 1) also includes a position indicator corresponding to the tape cartridge's position in the tape library.

Determining (250) if the activated RFID tag n corresponds to the requested tape cartridge position may include determining if the gripper's position matches the position indicated by the label read request. If the gripper is in the position indicated by the label read request (250, yes branch), the method continues by determining (270) if the label information is correct. If the gripper is not in the position indicated by the label read request (250, no branch), the method continues by activating (260) RFID tag n+1.

Activating (260) a next RFID tag (x, y, n+1) may include activating an RFID tag affixed to a tape cartridge. In one embodiment, RFID tag (x, y, n+1) corresponds to an RFID tag affixed to a tape cartridge occupying a slot immediately adjacent to tape cartridge (x, y, n). The RFID tag may be activated responsive to activating (230) a field coil. In one embodiment, the RFID tag (x, y, n+1) is activated according to a timing delay indicated by a timing relay implemented in the corresponding tape cartridge. In other words, RFID tag (x, y, n+1) is activated a selected period of time after RFID tag (x, y, 1) has been activated.

Determining (270) if a tape label is correct may include determining if the information on the label of tape cartridge corresponding to the tape cartridge's position matches the current gripper position. If it is determined the information on the tape cartridge label is correct (270, yes branch), the method terminates. If it is determined that the information on the tape cartridge label is not correct (270, no branch), the method continues by reporting (280) an error.

Reporting (280) an error may include providing an indication that tape cartridge n's label does not correctly indicate tape cartridge n's position. In one embodiment, reporting (280) an error includes executing steps 210 through 270 for a plurality of tape cartridges, and compiling a report of identified errors. In another embodiment, reporting (280) an error includes reporting that the tape library inventory is inaccurate based on the identification of one error. Reporting (280) an error may include providing a report indicating the row and column in which the mislabeled cartridge is housed.

Processing (290) the full inventory of the tape library may include executing an inventory verification method. One embodiment of an inventory verification method is described in further detail with respect to FIG. 3.

Figure 3:
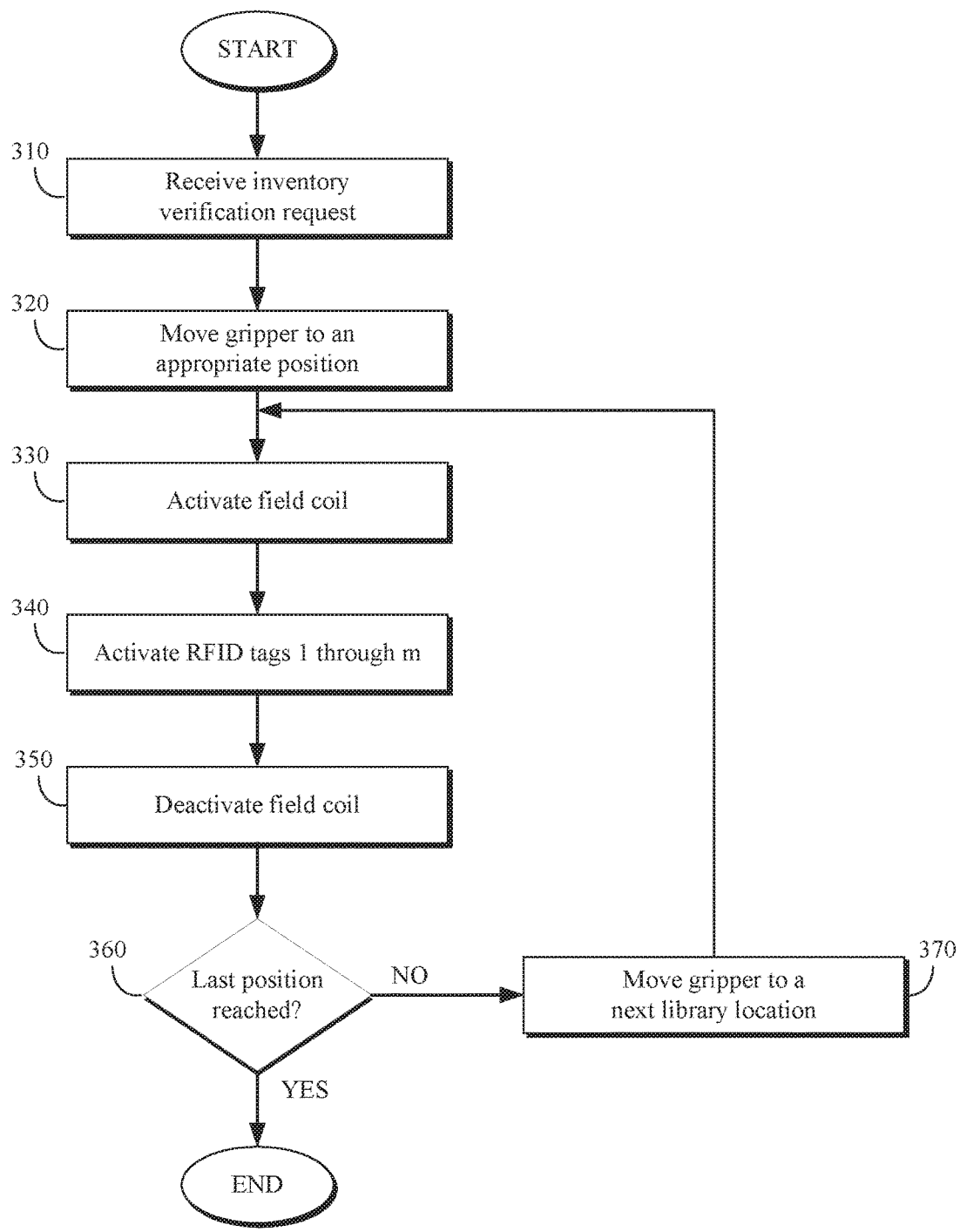
FIG. 3 is a flowchart depicting one example of an inventory verification method in accordance with at least one embodiment of the present invention.

FIG. 3 is a flowchart depicting one example of an inventory verification method 300 in accordance with at least one embodiment of the present invention. As depicted, inventory verification method 300 includes receiving (310) an inventory verification request, moving (320) a gripper to an appropriate position, activating (330) a field coil, activating (340) RFID tags 1 through m, deactivating (350) the field coil, determining (360) if the gripper has reached the last library position m, and activating (370) RFID tag m+1. Inventory verification method 300 may enable efficient verification of a tape cartridge library.

Receiving (310) an inventory verification request may include receiving a request to verify a tape library's inventory. In one embodiment, an inventory verification request may be initiated by a user via a user interface. In another embodiment, an inventory verification request may be initiated automatically responsive to detecting an error or an inaccuracy in a tape library's inventory. Receiving (310) an inventory verification request may additionally include receiving position information indicating one or more library positions to be verified.

Moving (320) a gripper to an appropriate position may include moving a gripper to a library position to be verified. In one embodiment, the appropriate position corresponds to a library position indicated by position information received along with the inventory verification request. In some embodiments, where an inventory verification request is created immediately responsive to detecting an error in a library inventory, the gripper may already be in an appropriate position to begin verification.

Activating (330) a field coil may include activating an electromagnet used to generate a magnetic field. The field coil may be housed in the gripper mechanism associated with the tape library. In at least one embodiment, the field coil is activated according to a user initiated request. In another embodiment, the field coil is activated automatically upon the gripper reaching the appropriate position.

Activating (340) RFID tags 1 through m may include activating RFID tags affixed to tape cartridges 1 through m. In one embodiment, RFID tag m corresponds to an RFID tag affixed to a tape cartridge occupying the last slot of a row. The RFID tags 1-m may be activated responsive to activating (330) a field coil. The field coil may be used to charge the RFID tags 1 through m, enabling each tape cartridge's label information to be transmitted. RFID tags 1 through m may each include a bar code as well as a volume serial number. In some embodiments, the RFID tag also includes a position indicator corresponding to the tape cartridge's position in the tape library. Tape cartridges 1 through m may be operably connected such that activating the RFID tag on tape cartridge 1 will activate the remaining tape cartridges up to cartridge m according to a time delay.

Deactivating (350) the field coil may include removing power from the field coil. Deactivating (350) the field coil removes the magnetic field emitted by the field coal, and therefore deactivates the RFID tags. The field coil may be deactivated by removing its power source.

Determining (360) if the gripper has reached the last library position may include determining if the current position of the gripper corresponds to a last library position as indicated by library inventory information. In one embodiment, determining (360) if the gripper has reached the last library position includes determining if the positional information of the last RFID tag activated, RFID tag m, corresponds to a last library position. If the gripper has reached the last library position (360, yes branch), the method terminates. If the gripper has not reached the last library position (360, no branch), the method continues by moving (370) the gripper to a next library position.

Moving (370) the gripper to a next library location may include moving the gripper to a next unprocessed tape cartridge slot in the tape library. In some embodiments, moving (370) the gripper to a next library location includes moving the gripper to the next row of the tape library. Moving (370) the gripper to a next library location may include moving the gripper to the next location indicated by the positional information included in the inventory verification request. Once the gripper has been moved to the next library location, the method continues by repeating steps 330-360 with respect to the next library location.

Figure 4A:
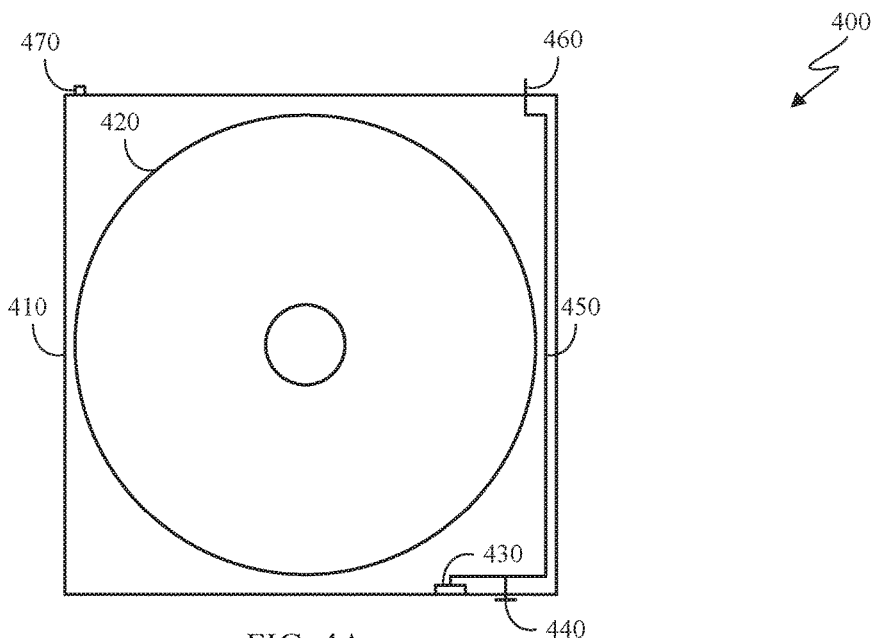
FIG. 4A depicts a tape cartridge in accordance with one embodiment of the present invention.

FIG. 4A depicts a tape cartridge 400 in accordance with one embodiment of the present invention. As depicted, tape cartridge 400 includes a housing shell 410, a magnetic tape wheel 420, a cartridge memory RFID chip 430, a contact plate 440, a timing relay 450, a pogo pin 460, and a distance adjusting bar 470. Tape cartridge 400 corresponds to one example of a tape cartridge configuration whose label information may be readable without the tape cartridge being moved.

Housing shell 410 may be a protective casing providing protection for the magnetic tape wheel 420 and the other depicted components. In one or more embodiments, housing shell 410 is a plastic enclosure. In the depicted embodiment, contacting pair plate 440 and distance adjusting bar 470 are affixed to the exterior of housing shell 410. A bar code label may also be printed on the exterior of the housing shell 410. In other embodiments, housing shell 410 comprises a top half-shell and a bottom half-shell, each half-shell being made of a conducting mix of materials. The top half-shell and the bottom half-shell may be mounted together with an isolator. In at least one embodiment, the top half-shell and the bottom half-shell each provide an enhanced bounce on opposing edges.

Magnetic tape wheel 420 may be a medium for magnetic storage made of a thin, magnetizable coating on a long, narrow strip of plastic film. One side of the tape, called the oxide side, is the surface that can be magnetically manipulated by a tape head. The oxide side stores information, and may be made of an oxide of iron or chromium. The opposite side of the tape may be made of a substrate to hold the tape together.

RFID chip 430 may be a chip configured to contain electronically stored identification information corresponding to tape cartridge 400. In one embodiment, RFID chip 430 contains a VOLSER number as well as a bar code. RFID chip 430 may be a passively charged tag configured to collect energy from a nearby reader. In one embodiment, a field coil affixed to a gripper provides energy to RFID chip 430. The RFID chip 430 may be activated responsive to the field coil being activated, or responsive to a contact plate 440 contacting a pogo pin 460.

Contact plate 440 may be a conductive plate affixed to the exterior of housing shell 410. Contact plate 440 may be operable connected to RFID chip 430 and pogo pin 460. In one embodiment, contacting plate 440 is configured to contact a pogo pin affixed to another tape cartridge. Contacting plate 440 may receive energy via the contacted pogo pin, and provides said energy to RFID chip 430 such that the identification information stored on RFID chip 430 may be accessed. In some embodiments, contacting plate 440 also passes energy to pogo pin 460 such that an RFID chip in another tape cartridge may be charged via the same manner described.

Relay 450 may be an electrically operated switch used to delay the transfer of charge from tape cartridge 400 to another tape cartridge. Delaying the transfer of charge from one tape cartridge enables information from sequential RFID chips to be transmitted according to a selected time delay. Implementing a time delay in this manner enables the information from each RFID chip to be received sequentially and in a predictable manner, such that the appropriate information can be attributed to the corresponding tape cartridge. Relay 450 may be a time delay relay utilizing a copper disk or a dashpot.

Pogo pin 460 may be a device used to establish a connection between tape cartridge 400 and another tape cartridge. In some embodiments, pogo pin 460 is a slender cylinder containing two sharp, spring loaded pins. When pressed between two circuits corresponding to the two tape cartridges, the sharp points at each end of pogo pin 460 make secure contacts with the two circuits and thereby connect them together.

Distance adjusting bar 470 may be a bar affixed to the exterior of housing shell 410. In one embodiment, distance adjusting bar 470 is a movable bar configured to keep tape cartridge 400 a selected distance away from an adjacent tape cartridge. Distance adjusting bar 470 may be configured to move when pressure is applied. This may enable a gripper to push two or more cartridges together such that the pogo pin on one cartridge comes in contact with the contact plate on another cartridge, such that charge may be transferred from cartridge to cartridge.

Figure 4B:
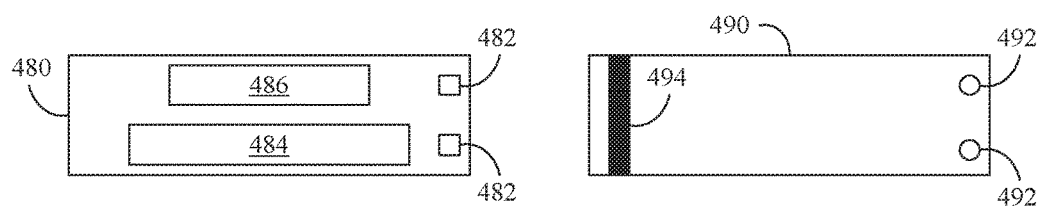
FIG. 4B depicts two sides of a tape cartridge in accordance with one embodiment of the present invention.

FIG. 4B depicts two sides 480 and 490 of a tape cartridge 400 in accordance with one embodiment of the present invention. As depicted, side 480 includes two contact plates 482, a barcode 484, and a VOLSER number 486. In the depicted embodiment, barcode 484 and VOLSER number 486 are not the primary means for identifying the tape cartridge, but are still present as a backup. Contact plates 482 are located such that they are aligned with pogo pins on an adjacent tape cartridge when the cartridges are pushed together. Side 490 includes two pogo pins 492 and a distance adjusting bar 494. Pogo pins 492 are positioned such that they are aligned with contact plates on an adjacent tape cartridge when the cartridges are pushed together. Distance adjusting bar 494 is configured such that when pressure is applied, distance adjusting bar 494 is pushed towards side 490 far enough that pogo pins 492 come in contact with contact plates on an adjacent cartridge.

Figure 5A:
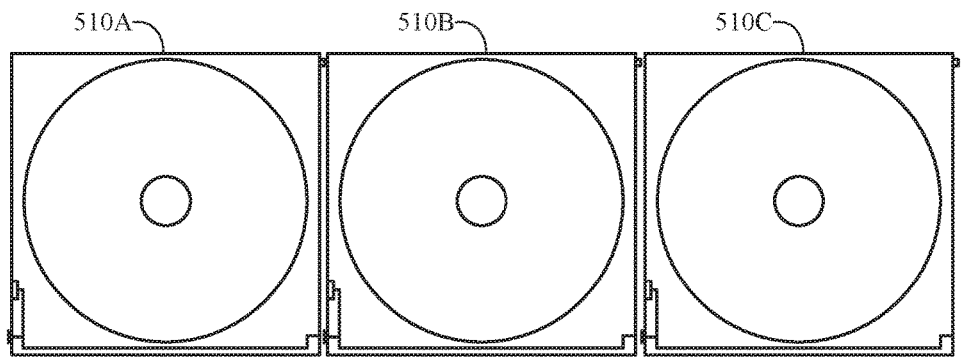
FIG. 5A depicts an example of a row of tape cartridges in accordance with one embodiment of the present invention.

FIG. 5A depicts an example of a row of tape cartridges 500 in accordance with one embodiment of the present invention. As depicted, the row of tape cartridges 500 includes three tape cartridges 510. Tape cartridges 510 are aligned such that a distance adjusting bar from one of the cartridges is pressed against the adjacent cartridge. As depicted, when the distance adjusting bars are compressed, the pogo pins from tape cartridge 510A will touch the contact plates from tape cartridge 510B, and the pogo pins from tape cartridge 510B will touch the contact plates from tape cartridge 510C. This contact between the pogo pins on one cartridge and the contact plates on another enables an electrical current to be applied to one of the tape cartridges and passed to the next.

Figure 5B:
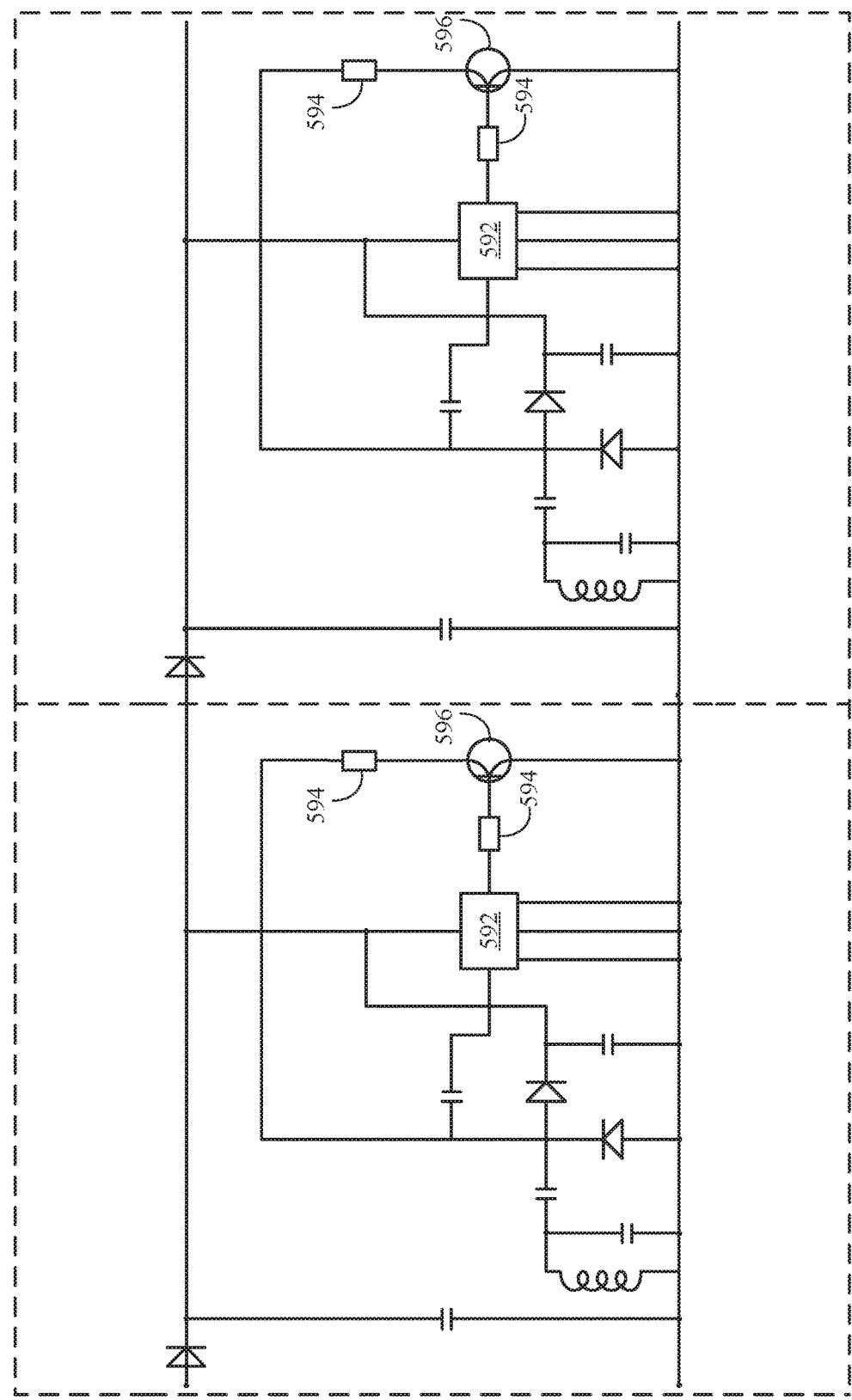
FIG. 5B is a circuit diagram depicting two connected circuits of two connected tape cartridges in accordance with one embodiment of the present invention.

FIG. 5B is a circuit diagram depicting two connected relay circuits 590 of two connected tape cartridges. As depicted, each relay circuit includes a plurality of diodes, capacitors, and inductors, depicted using standard symbols, as well as a counter 592 and circuit elements 594. The depicted connected circuits are one example of an implemented time delay relay in accordance with one embodiment of the present invention.

Figure 6:
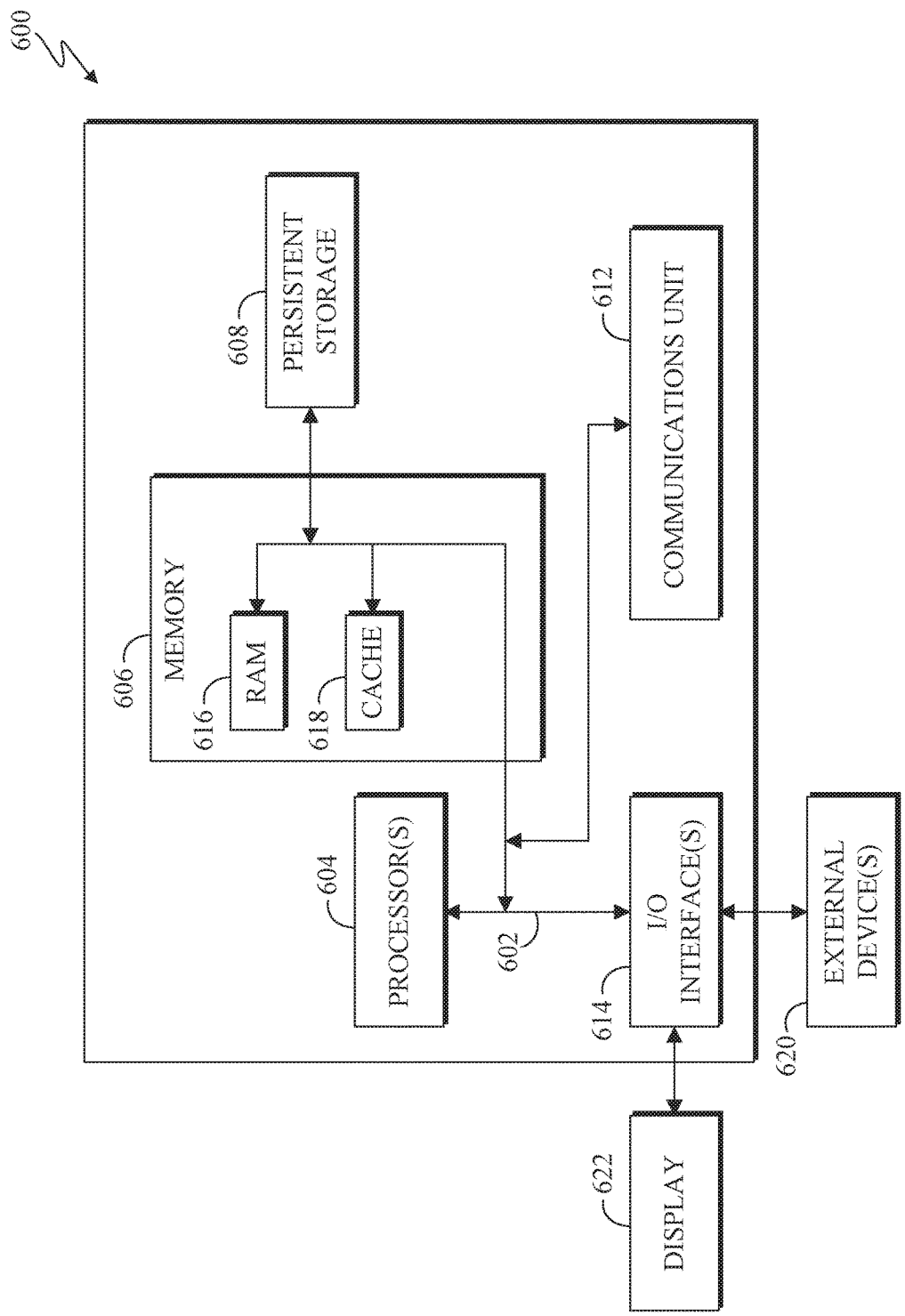
FIG. 6 depicts a block diagram of components of a computer, in accordance with some embodiments of the present invention.

FIG. 6 depicts a block diagram of components of computer 600 in accordance with an illustrative embodiment of the present invention. It should be appreciated that FIG. 6 provides only an illustration of one implementation and does not imply any limitations with regard to the environments in which different embodiments may be implemented. Many modifications to the depicted environment may be made.

As depicted, the computer 600 includes communications fabric 602, which provides communications between computer processor(s) 604, memory 606, persistent storage 608, communications unit 612, and input/output (I/O) interface(s) 614. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Memory 606 and persistent storage 608 are computer-readable storage media. In this embodiment, memory 606 includes random access memory (RAM) 616 and cache memory 618. In general, memory 606 can include any suitable volatile or non-volatile computer-readable storage media.

One or more programs may be stored in persistent storage 608 for access and/or execution by one or more of the respective computer processors 604 via one or more memories of memory 606. In this embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer-readable storage medium that is also part of persistent storage 608.

Communications unit 612, in these examples, provides for communications with other data processing systems or devices. In these examples, communications unit 612 includes one or more network interface cards. Communications unit 612 may provide communications through the use of either or both physical and wireless communications links.

I/O interface(s) 614 allows for input and output of data with other devices that may be connected to computer 600. For example, I/O interface 614 may provide a connection to external devices 620 such as a keyboard, keypad, a touch screen, and/or some other suitable input device. External devices 620 can also include portable computer-readable storage media such as, for example, thumb drives, portable optical or magnetic disks, and memory cards. Software and data used to practice embodiments of the present invention can be stored on such portable computer-readable storage media and can be loaded onto persistent storage 608 via I/O interface(s) 614. I/O interface(s) 614 also connect to a display 622.

Display 622 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
   receiving a tape cartridge label read request including at least a position indicator corresponding to a location of a tape cartridge of interest;
   moving a tape cartridge gripper to the location indicated by the position indicator;
   activating a field coil on the tape cartridge gripper to provide power to an RFID chip on a selected tape cartridge;
   detecting information transmitted by the RFID chip on the selected tape cartridge;
   determining if the selected tape cartridge is the tape cartridge of interest according to the detected information provided by the RFID chip on the selected tape cartridge and the position indicator; and
   activating a next RFID chip on an adjacent tape cartridge responsive to determining the selected tape cartridge is not the tape cartridge of interest.

2. The method of claim 1, further comprising providing a tape cartridge, wherein the tape cartridge comprises a tape cartridge housing and an RFID chip affixed to a tape cartridge housing.

3. The method of claim 2, wherein said RFID chip includes a tape cartridge ID and tape cartridge information.

4. The method of claim 1, further comprising providing a relay circuit operably connected to the RFID chip.

5. The method of claim 1, further comprising determining if the tape cartridge of interest is in an appropriate position as indicated by the received position indicator.

6. The method of claim 5, further comprising verifying the tape library's inventory responsive to determining the tape cartridge of interest is not in an appropriate position as indicated by the received position indicator.

7. The method of claim 6, wherein verifying the tape inventory's inventory comprises comparing each tape's position indicator to an expected position based on a tape gripper's current location.

8. A computer program product comprising:
   one or more computer readable storage media and program instructions stored on the one or more computer readable storage media, the program instructions comprising instructions to:
   receive a tape cartridge label read request including at least a position indicator corresponding to a location of a tape cartridge of interest;

move a tape cartridge gripper to the location indicated by the position indicator;

activate a field coil on the tape cartridge gripper to provide power to an RFID chip on a selected tape cartridge;

detect information transmitted by the RFID chip on the selected tape cartridge;

determine if the selected tape cartridge is the tape cartridge of interest according to the detected information provided by the RFID chip on the selected tape cartridge and the position indicator; and activate a next RFID chip on an adjacent tape cartridge responsive to determining the selected tape cartridge is not the tape cartridge of interest.

9. The computer program product of claim 8, further comprising instructions to provide a tape cartridge, wherein the tape cartridge comprises a tape cartridge housing and an RFID chip affixed to a tape cartridge housing.

10. The computer program product of claim 9, wherein said RFID chip includes a tape cartridge ID and tape cartridge information.

11. The computer program product of claim 8, further comprising instructions to provide a relay circuit operably connected to the RFID chip.

12. The computer program product of claim 8, further comprising instructions to determine if the tape cartridge of interest is in an appropriate position as indicated by the received position indicator.

13. The computer program product of claim 8, further comprising instructions to verify the tape library's inventory responsive to determining the tape cartridge of interest is not in an appropriate position as indicated by the received position indicator.

14. The computer program product of claim 13, wherein instructions to verify the tape library's inventory comprise instructions to compare each tape's position indicator to an expected position based on a tape gripper's current location.

15. An apparatus comprising:
a tape cartridge housing;
an RFID chip attached to the tape cartridge housing, wherein said RFID chip includes a tape cartridge ID and tape cartridge information;
a time relay operably connected to the RFID chip; and
external contact points configured to contact another RFID chip of another tape cartridge within the same tier.

16. The apparatus of claim 15, further comprising at least two conducting wires, at least two contacting plates, and at least two contacting pins.

17. The apparatus of claim 16, wherein the RFID chip is connected via the two external contacting plates to the external contacting pins using the conducting wires.

18. The apparatus of claim 15, wherein the tape cartridge housing comprises a top half-shell and a bottom half-shell, each half-shell being made of a conducting mix of materials.

19. The apparatus of claim 18, wherein the top half-shell and the bottom half-shell are mounted together with an isolator.

20. The apparatus of claim 19, wherein the top half-shell and the bottom half-shell each provide an enhanced bounce on opposing edges.

* * * * *